Sept. 17, 1940.　　W. F. SCHULTHEISS　　2,214,863
FLUSHING VALVE
Filed Dec. 10, 1937
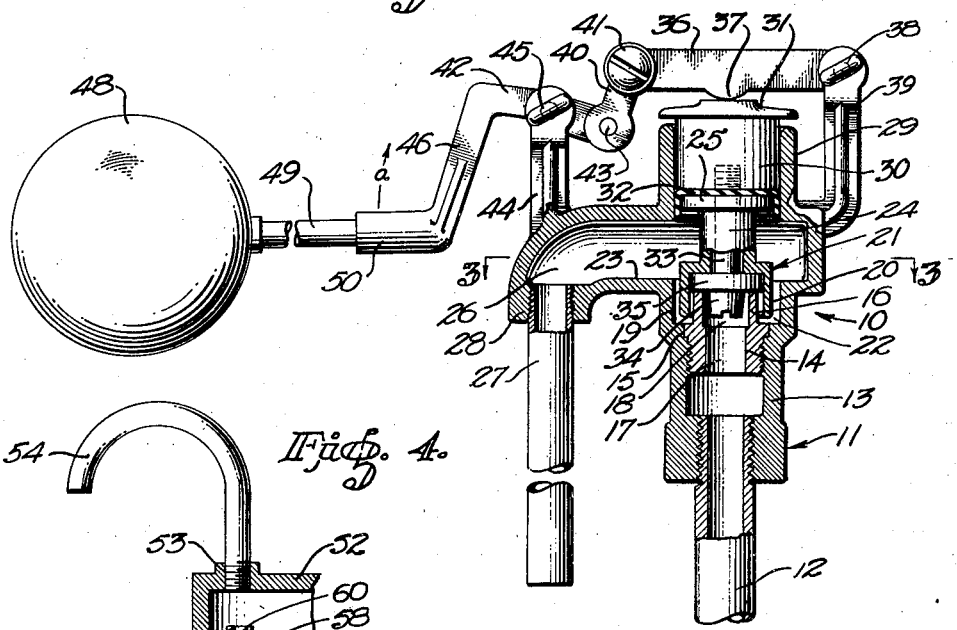
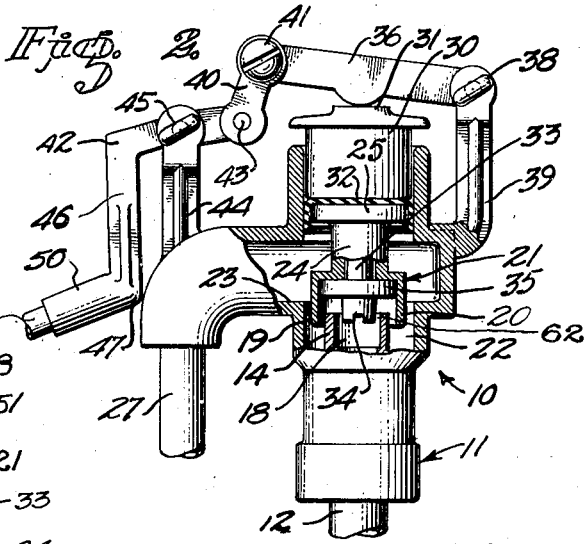
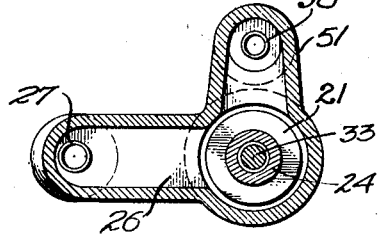
INVENTOR
WILLIAM F. SCHULTHEISS
BY James M. Abbott
ATTORNEY Patented Sept. 17, 1940

2,214,863

UNITED STATES PATENT OFFICE 2,214,863

FLUSHING VALVE

William F. Schultheiss, San Marino, Calif.

Application December 10, 1937, Serial No. 179,057

1 Claim. (Cl. 251—130)

This invention relates to plumbing equipment, and particularly pertains to flushing valves, the present application being a continuation in part of an earlier application entitled "Tank supply valve," filed by me February 19, 1935, and bearing Serial No. 7,829.

In the operation of ball cocks used to control the flow of water into flushing tanks, such as are associated with toilets, and for similar purposes, it is desirable to provide a valve which will open and close in a manner to eliminate a large proportion of the noise commonly produced by the friction of the water flowing through the valve as the valve moves to its open and closed position, and due to the fact that there is a possibility for back syphonage in the operation of toilet equipment it is desirable to provide a valve which will break the syphon and which will also be free to move to its closed position irrespective of the position of the ball float at the time back syphonage is created. It is the principal object of the present invention therefor to provide a flushing valve having a valve seat arrangement of peculiar design whereby the noise created by the flow of water through it will be minimized and back syphonage through the valve will be eliminated.

The present invention contemplates the provision of a valve housing provided with a vertically aligned valve guide and seat with relation to which a full floating valve element is disposed, said valve element having limited vertical movement and being arranged with relation to the valve seat in a manner to retain a telescoped position relative thereto. The valve structure further includes syphon breaking means and a float actuated lever structure for the valve.

The invention is illustrated by way of example in the accompanying drawing in which:

Figure 1 is a view in central vertical section through the valve with parts broken away to show the relation of the valve element and its seat when the valve is seated.

Fig. 2 is a view in elevation showing the valve with parts broken away and the valve and its seat in extreme opened relation to each other.

Fig. 3 is a view in horizontal section and elevation through the valve structure on line 3—3 of Fig. 1 disclosing the relationship of the fluid passageways to each other and the position of the valve element with relation thereto.

Fig. 4 is a view showing the position of the syphon breaking element and the overflow tube.

Referring more particularly to the drawing 10 indicates a valve housing having a vertical downwardly extending tubular portion 11. This element is internally threaded at its lower end to receive the water supply pipe 12. Above the threaded bore of the tubular extension 11 is an enlarged bore 13. This bore is threaded adjacent its upper end to receive a tubular valve seat bushing 14. The valve seat bushing includes a downwardly projecting threaded portion carrying a cylindrical collar 15 seating within the upper end of the bore 13 and an upwardly projecting valve seat portion 16 which is here disclosed as being of smaller diameter than the collar 15. The valve seat bushing 14 is formed with a central bore 17 which is substantially the same diameter as the inside diameter of the water supply pipe 12 and of lesser diameter than the bore 13, and since the ends of the pipe 12 and the valve seat bushing 14 are spaced from each other it will be seen by reference to Fig. 1 of the drawing that an enlarged water space will occur within the unoccupied portion of the bore 13. The upper end of the valve seat bushing 14 is counterbored as indicated at 18 for a purpose to be hereinafter described. The upper end of the bore 13 in the housing 10 is formed with a counterbore 19 which extends upwardly from the plane of the upper face of the collar 15. This counterbore is relatively large in diameter and accommodates the cylindrical skirt 20 of a valve element 21. The skirt 20 telescopes over the upwardly extending end portion 16 of the valve seat bushing 14 and extends within the counterbore 19. The inner wall of the skirt is spaced from the circumferential surface of the valve bushing extension 16 and the outer circumferential surface of the skirt 20 is spaced from the wall of the counterbore 19. This causes a fluid passageway of U-shaped section to occur between the upper extension 16 of the valve seat bushing 14 and the valve skirt 20 and between the valve skirt and the counterbore as indicated at 22. It should also be noted by reference to Figs. 1 and 2 that the valve skirt never lifts to a height sufficient to be beyond an encircling position with relation to the upwardly projecting portion 16 of the valve seat bushing. It is also to be noted in this connection that the depth of the counterbore 19 is greater than the height of the extension portion 16 of the valve seat bushing so that at all times the skirt 20 will project into the counterbore 22 with its lower edge a material distance below the lower horizontal wall 23 of housing 10 and in the plane of which the mouth of the counterbore 19 lies.

The valve element 21 has an upwardly projecting cylindrical portion 24 at the top of which an enlarged annular flange 25 is formed. The outside diameter of the annular flange 25 and the outside diameter of the skirt 20 are substantially the same, and the intermediate cylindrical portion 24 is of reduced diameter relative thereto. Thus the liquid within the chamber 26 of the valve housing 10 will tend to balance the valve 21 so far as fluid pressure is concerned. The chamber 26 extends laterally to provide communication with a filling pipe 27 which stands vertically and is threaded into a downwardly projecting boss 28 in the housing. Extending upwardly from the chamber 26 and in longitudinal vertical alignment with the portion 11 of the housing 10 is a hollow cylinder 29 which receives the annular flange 25 and a plunger 30. The plunger 30 is of a diameter greater than that of the flange 25 and is free to reciprocate vertically through the cylinder 29. The upper end of the plunger 30 is formed with an enlarged head 31 which overhangs the upper end of the cylinder 29. Disposed between the lower face of the plunger 30 and the upper face of the flange 25 is a cup washer 32, the marginal portion of which extends downwardly and around the circumferential edge of flange 25. The cup washer 22 forms a fluid seal with the cylindrical bore of the cylinder 29. The washer is held in place by a screw 33 which extends upwardly through a central bore in the valve element 21 and which is threaded into the lower face of the plunger 30. The screw 33 is fitted with a relatively long head 34 which is tapered on its sides and projects downwardly into the counterbore 19 of the valve bushing at all times for a purpose to be hereinafter described. The screw head 34 engages a valve washer 35 and holds it within the skirt 20 of the valve element 21. The valve washer 35 substantially fits within the skirt 20 and rests upon the upwardly presented valve seat formed by the extension portion 16 of the valve seat bushing 14. The valve washer 35 is normally held on its seat by the weight of the valve element 21 and the plunger 30. It may be drawn against its seat by the additional suction action produced by a back syphonage in the water supply pipe 12.

The valve element 21 with its super-imposed plunger 30 is free to float in the housing as guided by the cylinder 29 within which the plunger 30 reciprocates. It may be, however, moved on to its seat by pressure exerted by the valve lever 36 which extends transversely of the top of the plunger 30 and is formed with a projecting portion 37 which bears against the head 31 of the plunger 30. One end of the lever 36 is mounted upon a removable pivot pin 38 carried in a standard 39 of the housing 10. The opposite end of the lever 36 is free to move and is attached to a link 40 by a screw 41. The link hangs downwardly from the screw 41 and is attached to a float lever 42 by a pivot screw 43. The float lever 42 is pivotally supported upon a standard 44 which carries a removable pivot pin 45. The float lever 42 has a downwardly extending portion 46 which swings toward and away from the end wall of the chamber 26 and is limited in its downward movement when the portion 47 of the lever engages this end wall as shown in Fig. 2 of the drawing. This is pointed out to emphasize the fact that even though the flush tank might be sufficiently empty to permit the float lever 46 to assume its lowermost position as shown in Fig. 2, yet back syphonage acting through the water supply pipe 12 would be free to draw the valve element 21 downwardly to a seated position, since there is no connection between the valve element 21 or the plunger 30 with the float lever mechanism. It will be understood that the float lever 42 carries a conventional type of float ball 48 which is mounted on a rod 49 secured into a boss 50 of the extending portion 46 of the lever.

The construction and mounting of the valve element 21 is such as to insure that the valve will act as a line stopper when it is closed by the positive action of the float ball and its mechanism, or by back syphonage. In order, however, to insure that the back syphonage action will be broken additional syphon breaking means are provided. These are mounted in an extension 51 which communicates with the chamber 26 of the housing. This extension has a top wall 52 through which a threaded opening 53 is formed. An afterfill pipe 54 is mounted in the threaded opening as shown in Fig. 4 of the drawing. The capacity of the space in this the afterfill pipe 54 is such that under high vacuum action and depending on the size of a valve seat leak the pipe 54 will not be sufficient to break the syphon. In order to give additional syphon breaking action a syphon breaker 55 is provided. This comprises a threaded member 56 which extends through a threaded opening in the bottom wall of the housing portion 51. The lower end of the member 56 is formed with an enlarged head to facilitate in securing the member 55 in position. A central opening 57 is formed through the head and a larger counterbore 58 is in longitudinal alignment and communication therewith. This counterbore accommodates a valve ball 59 which when resting over the opening 57 tends to normally close the opening 58 against the outflow of water and the opening 57 against the inflow of air. A stop pin 60 is disposed in the path of the ball 59 and limits its upward movement. The valve seat 61 upon which the ball 59 rests is corrugated so that the chamber 26 will not be sealed to allow an accumulation of water therein and an undesirable accumulation of substances on the valve seat which would tend to seal the valve ball to the seat and interfere with the effective operation of the valve.

In operation of the flushing valve here shown the structure is assembled as disclosed in the drawing and placed in a conventional type of flush tank. The pipe 12 is connected with a suitable water supply and the pipe 27 is provided to extend downwardly to a point adjacent the bottom of the tank and to be submerged in the water of the tank. When the tank is to be filled water is delivered through the water supply pipe 12 and passes upwardly to exert a force against the portion of the valve washer 35 occurring within the counterbore 18 of the valve seat extension 16 and also exerting force against the head 34 of the screw 33. This will force the valve element 21 and the plunger 30 upwardly. As this takes place the downwardly projecting tapered head 34 of the screw 33 will gradually withdraw from the counterbore 18 of the valve bushing and will progressively increase the effective passage of area around the screwhead 34 and between it and the circumscribing wall of the valve seat bushing 14. The action will be to gradually increase the volume of flow of water through the valve seat bushing 14 and to prevent an excessive and objectionable noise as caused by the water during the time the valve is opening and when it is closing. The water released to pass through the space 62 which occurs between the head 34 of the screw 33 and the valve seat bushing 14 will then be reversed in its direction of flow to pass around the upper lip of the valve seat bushing and then around the circumscribing passageway 22 of the U-shaped section and into the chamber 26 of the housing. It will be noted that as the volume of water permitted to pass through the space 62 increases due to the retraction of the tapered screw head 34 from within the valve seat bushing 14 that the lip of the skirt 20 raises to increase the area of the passageway 22. By this arrangement it has been found that even when water supply is under excessive high pressure such for example as one hundred seventy-five pounds per square inch, the noise incident to the flow of water through the valve is materially decreased over valve structures of other type and design and permits the valve to function quietly and without undue strain. When the water flows into the chamber 26 it will create pressure against the edge of the packing cup 32 and will form a fluid seal between this cup and the cylindrical bore of the cylinder 29. The water will flow from the chamber 26 into the filling pipe 27. As the level of the water is raised the float ball 48 will also lift. This will gradually swing the float ball lever 42 in the direction of the arrow "a" and will exert a downward pull upon the free end of the valve lever 36 through the link 40. The result will be that the projection 37 on the lever 36 will engage the head 31 on the top of the plunger 30 and force the plunger and the valve element 21 downwardly to cut off the flow of water through the water supply pipe 12. This downward forcing action will cause a reverse condition between the valve skirt 20, the valve bushing 14, and the screw head 34 from that described from the valve opening. The skirt will gradually move downwardly and close the effective area of the passageway 22 and the tapered head 34 of the screw 33 will gradually move downwardly and close the effective opening 62 therearound until the valve washer 35 is seated upon the lip of the extension 16 of the valve bushing.

In the event that back syphonage occurs when the water pressure in the pipe 12 is negative rather than positive, there will be a tendency for the water in the tank to be drawn upwardly through the pipe 27 and into the chamber 26 when the valve element 21 is in its raised position. It will be recognized that under such conditions as the valve element 21 is freely movable it will be instantly drawn downwardly so that its washer 35 will seat firmly against the lip of the extension 16 of the valve bushing. This will act to completely cut off the line of flow and the greater the intensity of the back syphonage action the greater the tendency to draw the valve washer 35 on to its seat. In order to insure that the back syphonage action is completely broken air may be drawn in through the pipe 54 and in addition it may be drawn in through the syphon breaker 55 as the valve ball 59 is lifted and air permitted to enter the portion 51 of the housing and the chamber 26. Attention is directed to the fact that regardless of the position of the float ball 48 and its lever mechanism, when a condition of back syphonage occurs the valve element 21 and its plunger 30 will be free to move on to their seats so that the syphoning action will be stopped and since this operation can take place without moving or influencing the float valve and its mechanism, it is evident that the valve here disclosed will efficiently prevent back syphoning and will also make it possible for a valve to be opened and closed effectively without excessive noise. Attention is also directed to the fact that the construction here-disclosed makes it possible to dismantle the valve or reassemble it when desired without difficulty, since by the removal of the pin 38, the valve lever 36 and the float lever 42 may be lifted from above the valve housing. This will afford unobstructed access to the plunger 30, and since the bore through the cylinder 29 is greater than the diameter of the plunger, or the valve element, these parts may be instantly lifted out of the housing for repair or replacement.

It will thus be seen that the flushing valve structure here disclosed is simple and effective in operation, provides a quietly acting valve and a valve in which back syphoning is instantly interrupted.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

In a valve construction for controlling the water supply to a flush valve or the like, a valve housing having a supply pipe in communication with the lower portion thereof, an outlet therefor, a counter-bore surrounding the supply inlet, the lower portion of said counter-bore terminating in a horizontal shoulder, a valve seat bushing positioned within the supply inlet and extending upwardly above said horizontal shoulder and providing a space between said valve seat bushing and the counter-bore, the upper portion of said housing having an upwardly and outwardly projecting hollow cylinder in axial alignment and of substantially the equal diameter as the counter-bore, a free floating valve element adapted to be positioned within the valve housing comprising a hollow cylindrical central portion, an enlarged cylindrical skirt formed on the lower portion of said valve element, said skirt being of a length greater than the upwardly extending portion of said valve seat and positioned therefrom to form a U-shaped fluid passageway between the valve seat and the counter-bore and around the valve skirt, the upper end of said valve element terminating in an annular flange of substantially equal diameter to the valve skirt, a plunger positioned above the annular flange within the outwardly projecting hollow cylinder of the valve housing, a cup washer interposed between the annular flange of the valve member and the plunger, the downwardly extending portion of said washer surrounding said annular flange and conforming to the diameter of the upwardly extending cylinder of the housing, a valve washer positioned within the skirt of the valve element adapted to rest upon the valve seat of the valve bushing, a threaded screw extending through the valve washer, the hollow central portion of the valve element, the cup washer, and terminating within a threaded bore of the plunger to hold said elements as a complete unit, and means for limiting the upward movement of the valve unit to prohibit the lower edge of the skirt to rise above the face of the valve seat.

WILLIAM F. SCHULTHEISS.